(12) United States Patent
Yamada et al.

(10) Patent No.: US 10,261,447 B2
(45) Date of Patent: Apr. 16, 2019

(54) PRINTING APPARATUS AND CONTROL METHOD OF PRINTING APPARATUS

(71) Applicant: SEIKO EPSON CORPORATION, Tokyo (JP)

(72) Inventors: Shohei Yamada, Shiojiri (JP); Ikuya Koshimizu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/919,949

(22) Filed: Mar. 13, 2018

(65) Prior Publication Data

US 2018/0267438 A1 Sep. 20, 2018

(30) Foreign Application Priority Data

Mar. 16, 2017 (JP) .................. 2017-050914

(51) Int. Cl.
| | |
|---|---|
| G03G 15/16 | (2006.01) |
| G06F 3/12 | (2006.01) |
| H04N 1/00 | (2006.01) |
| B41J 29/02 | (2006.01) |
| B41J 2/135 | (2006.01) |

(52) U.S. Cl.
CPC .......... *G03G 15/1615* (2013.01); *B41J 29/02* (2013.01); *G06F 3/1201* (2013.01); *H04N 1/0057* (2013.01); *B41J 2/135* (2013.01); *G03G 2215/00637* (2013.01)

(58) Field of Classification Search
USPC ........................................ 358/1.15
See application file for complete search history.

(56) References Cited

U.S. PATENT DOCUMENTS 5,385,414 A * 1/1995 Shirotori ............... B41J 2/5056
400/124.02
2013/0163773 A1* 6/2013 Liu ...................... G10K 11/178
381/71.3

FOREIGN PATENT DOCUMENTS

| JP | 05-177879 A | 7/1993 |
|---|---|---|
| JP | 05-261975 A | 10/1993 |

* cited by examiner

*Primary Examiner* — Ngon B Nguyen
(74) *Attorney, Agent, or Firm* — Foley & Lardner LLP

(57) ABSTRACT

A printing apparatus including a plurality of print driving units for printing a print dot on a print medium, a storage unit that stores a generated electromagnetic wave noise value which is a value of an electromagnetic wave noise to be generated by driving the print driving unit and an allowable electromagnetic wave noise value indicating tolerance of the generated electromagnetic wave noise, as electromagnetic wave noise data, and a control unit that controls driving of the print driving unit, in which the control unit controls the number of the print driving units to be simultaneously driven so as to be the generated electromagnetic wave noise value equal to or less than the allowable electromagnetic wave noise value.

5 Claims, 9 Drawing Sheets

FIG. 7

| DRIVING INTERVAL [μS] | GENERATED ELECTROMAGNETIC WAVE NOISE VALUE [dBμV/m] | CLASS A ALLOWABLE VALUE [42.0 dBμV/m] | CLASS B ALLOWABLE VALUE [38.0 dBμV/m] |
|---|---|---|---|
| 0 | 47.6 | × | × |
| 1 | 45.8 | × | × |
| 2 | 43.4 | × | × |
| 3 | 41.5 | ○ | × |
| 4 | 40.4 | ○ | × |
| 5 | 39.3 | ○ | × |
| 6 | 39.6 | ○ | × |
| 7 | 37.3 | ○ | ○ |
| 8 | 36.2 | ○ | ○ |
| 9 | 35.9 | ○ | ○ |
| 10 | 35.1 | ○ | ○ |
| 13 | 35.8 | ○ | ○ |
| 15 | 34.4 | ○ | ○ |

FIG. 9

| THE NUMBER OF PINS SIMULTANEOUSLY DRIVEN | GENERATED ELECTROMAGNETIC WAVE NOISE VALUE [dBμV/m] | CLASS A ALLOWABLE VALUE [42.0 dBμV/m] | CLASS B ALLOWABLE VALUE [38.0 dBμV/m] |
|---|---|---|---|
| 24 | 47.6 | × | × |
| 23 | 46.3 | × | × |
| 22 | 45.2 | × | × |
| 21 | 44.4 | × | × |
| 20 | 43.6 | × | × |
| 19 | 43.0 | × | × |
| 18 | 42.5 | × | × |
| 17 | 41.9 | ○ | × |
| 16 | 41.3 | ○ | × |
| 15 | 40.8 | ○ | × |
| 14 | 40.2 | ○ | × |
| 13 | 39.8 | ○ | × |
| 12 | 39.3 | ○ | × |
| 11 | 38.9 | ○ | × |
| 10 | 38.6 | ○ | × |
| 9 | 38.2 | ○ | × |
| 8 | 37.9 | ○ | ○ |
| 7 | 37.7 | ○ | ○ |
| 6 | 37.4 | ○ | ○ |
| 5 | 37.0 | ○ | ○ |
| 4 | 36.7 | ○ | ○ |
| 3 | 36.4 | ○ | ○ |
| 2 | 36.0 | ○ | ○ |
| 1 | 35.7 | ○ | ○ |

PRINTING APPARATUS AND CONTROL METHOD OF PRINTING APPARATUS

BACKGROUND

1. Technical Field

The present invention relates to a printing apparatus and a control method of the printing apparatus of reducing an electromagnetic wave noise to be generated when performing printing.

2. Related Art

In the related art, there are printing apparatuses in which characters and images to be printed are represented by digital data as print data, printing heads are driven based on the digital data, and characters and images are printed on a print medium. For example, in JP-A-5-177879, a wire dot printing apparatus (hereinafter, SIDM printing apparatus: serial impact dot matrix) in which the characters and images are printed by driving a dot pin (wire pin) of a printing head based on the print data is disclosed. Furthermore, in JP-A-5-177879, disclosed is a solution to a problem that the magnetic flux (magnetic field) is generated from an electromagnetic coil by the driving current for driving the dot pin and the generated magnetic flux adversely affects an operation of another electromagnetic coil.

However, when the magnetic flux is generated from the electromagnetic coil due to the driving current for driving a printing head as in a SIDM printing apparatus of JP-A-5-177879, the magnetic flux not only adversely affects an operation of other electromagnetic coils but also it becomes an electromagnetic wave noise due to electromagnetic waves leaked to the outside from the printing apparatus. Since the electromagnetic wave noise may cause damage to other electronic apparatuses and systems, it should be minimized as much as possible. Therefore, the tolerance of electromagnetic wave noise is regulated strictly in each country. For example, in the regulation (EMI regulation: electromagnetic interference regulation) relating to EMI noise as the electromagnetic wave noise, there are international standards such as international special committee radio interference (CISPR) regulation, domestic voluntary control council for information (VCCI: radio frequency interference voluntary control council for information processing equipment) regulation, federal communications commission (FCC) regulation in the United States, and the like. In these EMI regulations, a test method and tolerance on an EMI noise emission amount are defined. Therefore, it is necessary for the electronic apparatus and a system that generate the EMI noise to comply with EMI regulation while suppressing the EMI noise within the tolerance defined in the EMI regulation.

In addition, even in an inkjet printing apparatus that selectively ejects ink from nozzles of a printing head and performs printing not limited to the SIDM printing apparatus, or a thermal printing apparatus or the like which selectively heats a heat generating element of the printing head and performs printing by using thermal paper, since the driving current flows through an electronic element and a wiring during a printing operation, there is a possibility that electromagnetic wave noise is generated.

Accordingly, in order to suppress the possibility of impairing other electronic apparatuses and systems, and to comply with the EMI regulation, means for suppressing an electromagnetic wave noise value to be generated is important. In JP-A-5-177879, there is neither suggestion nor disclosure on the above-mentioned problem related to electromagnetic wave noise and its solution means.

SUMMARY

An advantage of some aspects of the invention is to provide a low electromagnetic wave noise printing apparatus which performs printing control to estimate the electromagnetic wave noise value to be generated based on the print data, and to suppress the electromagnetic wave noise value, and even if a configuration of the printing apparatus and the tolerance of the EMI regulation are changed, to provide a low electromagnetic wave noise printing apparatus which can easily comply with the EMI regulation.

The invention is to solve at least a part of the above-mentioned problems, and the invention can be realized as the following embodiments or application examples.

Application Example 1

According to this application example of the invention, there is provided a printing apparatus including: a plurality of print driving units for printing a print dot on a print medium; a storage unit that stores a generated electromagnetic wave noise value which is a value of an electromagnetic wave noise to be generated by driving the print driving unit and an allowable electromagnetic wave noise value indicating tolerance of the generated electromagnetic wave noise, as electromagnetic wave noise data; and a control unit that controls driving of the print driving unit, in which the control unit controls the number of the print driving units to be simultaneously driven so as to be the generated electromagnetic wave noise value equal to or less than the allowable electromagnetic wave noise value.

According to the configuration, the printing apparatus performs control for reducing the number of a plurality of the print dots which is printed simultaneously in a case where the generated electromagnetic wave noise value to be generated at the time of printing becomes greater than the allowable electromagnetic wave noise value so as to be a generated electromagnetic wave noise value less than the allowable electromagnetic wave noise value. Specifically, printing is performed by controlling to reduce the number of the print driving units to be driven. With this, since a generated electromagnetic wave noise to be generated at the time of printing is suppressed and decreases, it is possible to decrease the generated electromagnetic wave noise value less than the allowable electromagnetic wave noise value. In addition, since the printing apparatus stores the generated electromagnetic wave noise value and the allowable electromagnetic wave noise value as the electromagnetic wave noise data in the storage unit, in a case where a configuration of the printing apparatus and tolerance of the EMI regulation are changed, it is possible to change the electromagnetic wave noise data stored based on this condition, and it is easy to comply with the EMI regulation.

Application Example 2

In the printing apparatus according to the application example, it is preferable that the control unit reduce the number of the plurality of print dots which simultaneously printed by dividing the plurality of the print dots with a predetermined time interval and controlling the print driving unit.

According to the configuration, the plurality of the print dots are divided and printed with a predetermined time interval therebetween. Therefore, by reducing the number of the print dots which is printed simultaneously, the generated electromagnetic wave noise generated at the time of printing is suppressed and decreases.

Application Example 3

In the printing apparatus according to the application example, the printing apparatus further includes a print pattern generation unit, and it is preferable that the print pattern generation unit specify the plurality of the print dots which simultaneously printed by generating a print pattern of the print dot from print data, the control unit specify the generated electromagnetic wave noise value generated at the time of printing based on the print data from the generated electromagnetic wave noise value stored in the storage unit based on the plurality of the specified print dots which simultaneously printed.

According to the configuration, the print pattern generation unit causes the print pattern of the print dot to be generated from the print data. As a result, the plurality of the print dots which simultaneously printed is specified. Therefore, the control unit can grasp the plurality of the print dots which simultaneously printed, and can specify the generated electromagnetic wave noise value to be generated at the time of printing based on the print data from data of the generated electromagnetic wave noise value stored in the storage unit.

Application Example 4

In the printing apparatus according to the application example, it is preferable that the printing apparatus further include an interface unit that performs communication with an external device, the storage unit be a non-volatile memory in which data to be stored can be rewritten, and the control unit capture the electromagnetic wave noise data from the external device through the interface unit, and store the captured electromagnetic wave noise data in the storage unit.

According to the configuration, since the printing apparatus includes the interface unit that performs communication with an external device, the printing apparatus can transmit and receive data to and from the external device. Furthermore, the storage unit is a non-volatile memory in which data can be rewritten, the printing apparatus captures new electromagnetic wave noise data from the external device through the interface unit, and can rewrite the electromagnetic wave noise data stored in the non-volatile memory as the storage unit into new electromagnetic wave noise data. Therefore, the printing apparatus can electrically replace the electromagnetic wave noise data appropriately, without performing a physical operation such as exchanging of the storage unit. As a result, even in a case where a configuration of the printing apparatus and the tolerance of the EMI regulation are changed, it is possible to easily comply with the EMI regulation by appropriately changing the electromagnetic wave noise data stored based on this condition.

Application Example 5

According to this application example of the invention, there is provided a control method of the printing apparatus including: driving a plurality of print driving units for printing a print dot on a print medium; storing a generated electromagnetic wave noise value which is a value of an electromagnetic wave noise to be generated by driving the print driving unit and an allowable electromagnetic wave noise value indicating tolerance of the generated electromagnetic wave noise; and controlling the number of the print driving units to be simultaneously driven so as to be the generated electromagnetic wave noise value equal to or less than the allowable electromagnetic wave noise value.

According to the method, the printing apparatus performs control for reducing the number of the plurality of the print dots which is printed simultaneously in a case where the generated electromagnetic wave noise value to be generated at the time of printing becomes greater than the allowable electromagnetic wave noise value so as to be a generated electromagnetic wave noise value less than the allowable electromagnetic wave noise value. Specifically, control is performed to reduce the number of the print driving units to be driven. With this, since a generated electromagnetic wave noise to be generated at the time of printing is suppressed and decreases, it is possible to decrease the generated electromagnetic wave noise value less than the allowable electromagnetic wave noise value. In addition, since the printing apparatus stores the generated electromagnetic wave noise value and the allowable electromagnetic wave noise value as the electromagnetic wave noise data in the storage unit, even in a case where the configuration of the printing apparatus and the tolerance of the EMI regulation are changed, it is possible to change the electromagnetic wave noise data stored based on this condition, and it is easy to comply with the EMI regulation.

BRIEF DESCRIPTION OF THE DRAWINGS

The invention will be described with reference to the accompanying drawings, wherein like numbers reference like elements.

FIG. 7 is a diagram showing an example of electromagnetic wave noise data.

FIG. 9 is a diagram showing another example of the electromagnetic wave noise data.

DESCRIPTION OF EXEMPLARY EMBODIMENTS

Embodiment

Figure 1:
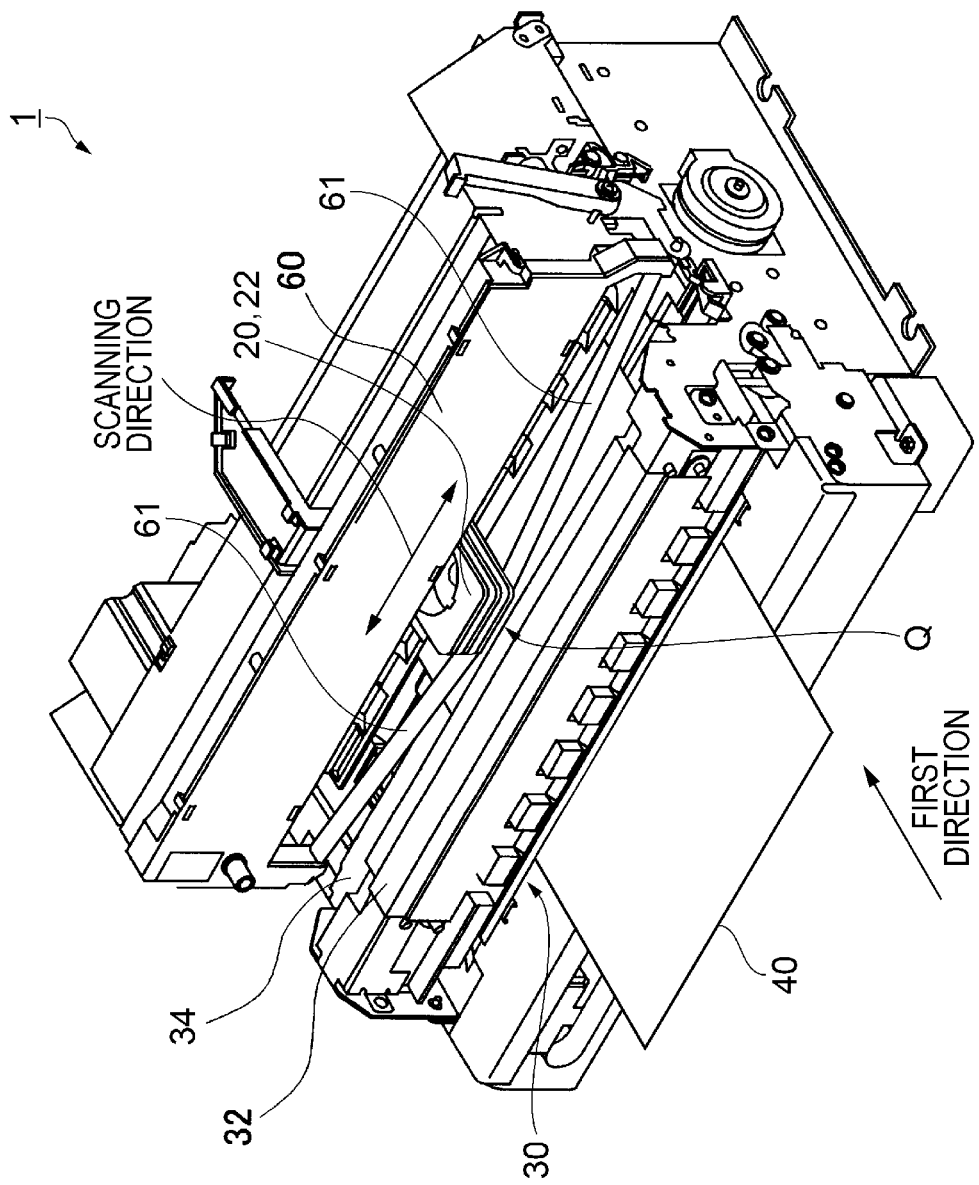
FIG. 1 is a perspective view showing an internal configuration of a printing apparatus.

Hereinafter, an embodiment of a printing apparatus to which the invention is applied will be described with reference to the drawings. In the embodiment, as the printing apparatus, a SIDM printing apparatus 1 (hereinafter, simply referred to as printing apparatus 1) will be described as an example.

In the drawings referred to in the following description, for the sake of convenience of explanation and illustration, the vertical and horizontal scales of the members or parts may be expressed differently from the actual ones. In addition, the illustration may be omitted other than necessary components for an explanation.

Overall Configuration of Printing Apparatus

FIG. 1 is a perspective view showing an internal configuration of the printing apparatus 1. The printing apparatus 1 prints print data such as character information and images on a cut sheet, a film, a copying paper on which a plurality of sheets are superimposed, a passbook or notebook in a booklet form, and the like. In the printing apparatus 1 shown in FIG. 1, a cut sheet 40 is loaded as a print medium.

The cut sheet 40 inserted through the print medium insertion slot 30 is transported to a print position Q by a transmitting roller (not shown) or the like. At the print position Q, a printing head 22 (see FIG. 2) including a plurality of dot pins for printing and a platen 34 facing the printing head 22 are disposed. The printing head 22 is mounted on a carriage 20, and the carriage 20 is reciprocated (scanned) in the scanning direction intersecting with the first direction in which the cut sheet 40 is transported. The platen 34 is disposed on a surface on which the slip cut sheet 40 slides.

An ink ribbon cassette 60 facing the platen 34 is disposed in the vicinity of the printing head 22. An ink ribbon 61 is supplied from the ink ribbon cassette 60, and the ink ribbon 61 is set to pass between the printing head 22 and the platen 34. The cut sheet 40 passes through between the ink ribbon 61 and the platen 34 in the print position Q. In addition, in the vicinity of the print medium insertion slot 30, a print medium suppressing unit 32 for lifting and suppressing the cut sheet 40 is disposed.

Printing Head

Figure 2:
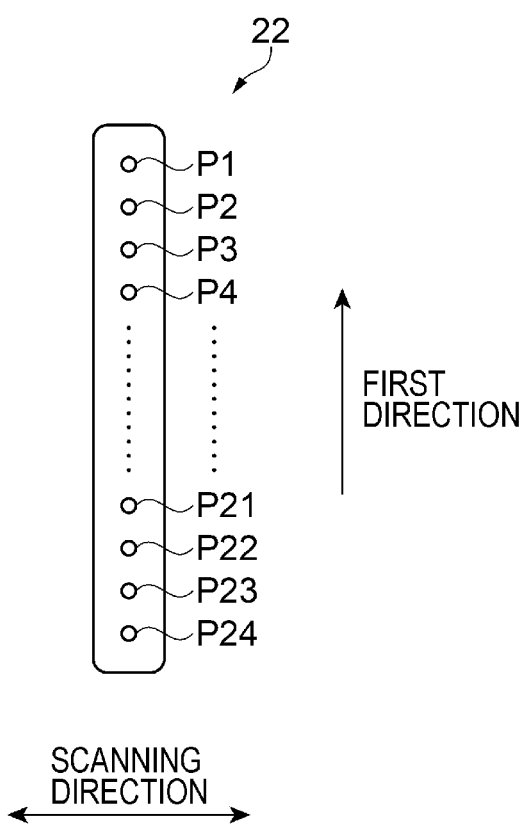
FIG. 2 is a diagram showing an example of a print dot arrangement in a printing head.

FIG. 2 is a diagram showing an example of an arrangement of the dot pins P1 to P24 in the printing head 22. As shown in FIG. 2, in the printing head 22, the dot pins P1 to P24 are arranged in a column in the first direction along which the cut sheet 40 is transmitted. At the time of printing, one of the dot pins P1 to P24 protrudes from the printing head 22 toward the platen 34 corresponding to the print pattern generated based on the print data. With this, the ink ribbon 61 is pressed against the cut sheet 40 and printing of the print data is performed by the printing of a print dot corresponding to one dot pin and by repeating this. In the dot pins P1 to P24, there is a case where one dot pin protrudes according to the print pattern, a case where the plurality of dot pins equal to or greater than two protrude simultaneously, or a case where all dot pins protrude simultaneously.

Figure 3:
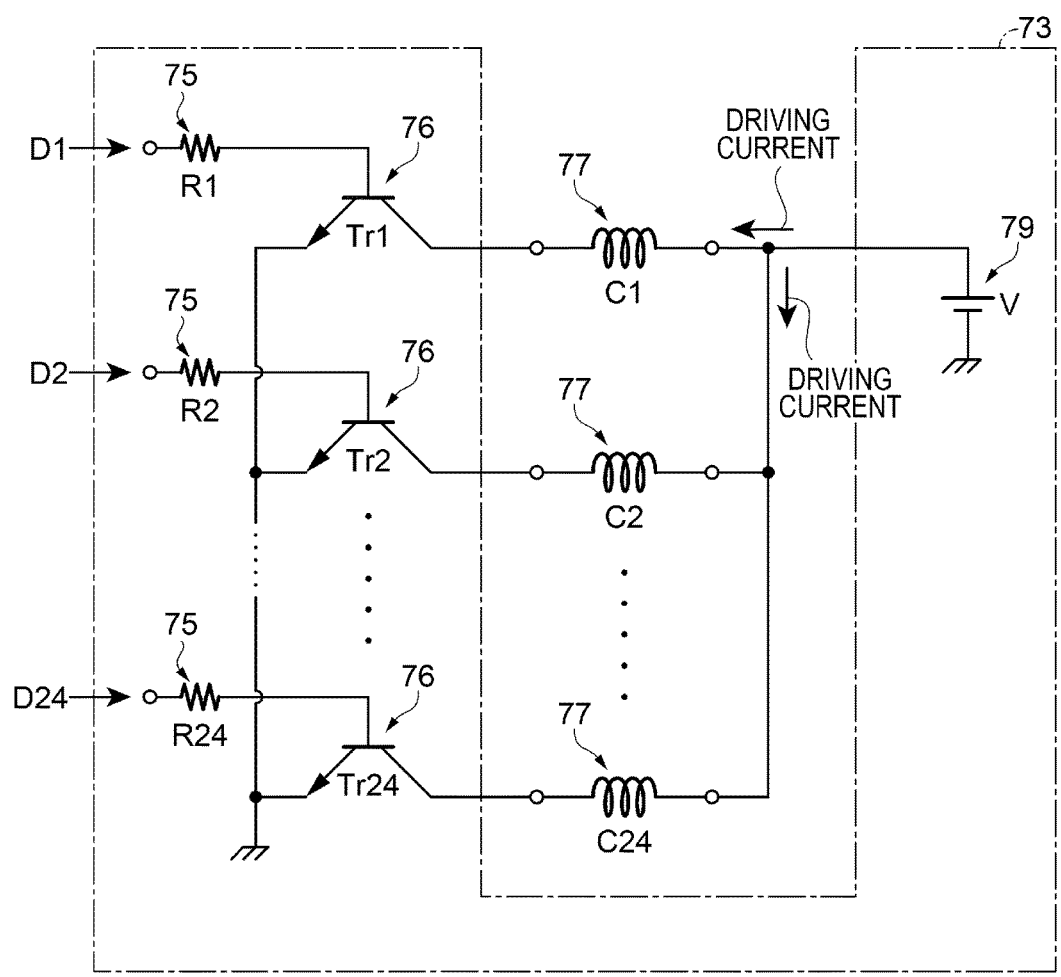
FIG. 3 is a diagram showing an example of a driving circuit in the printing head.
Figure 4:
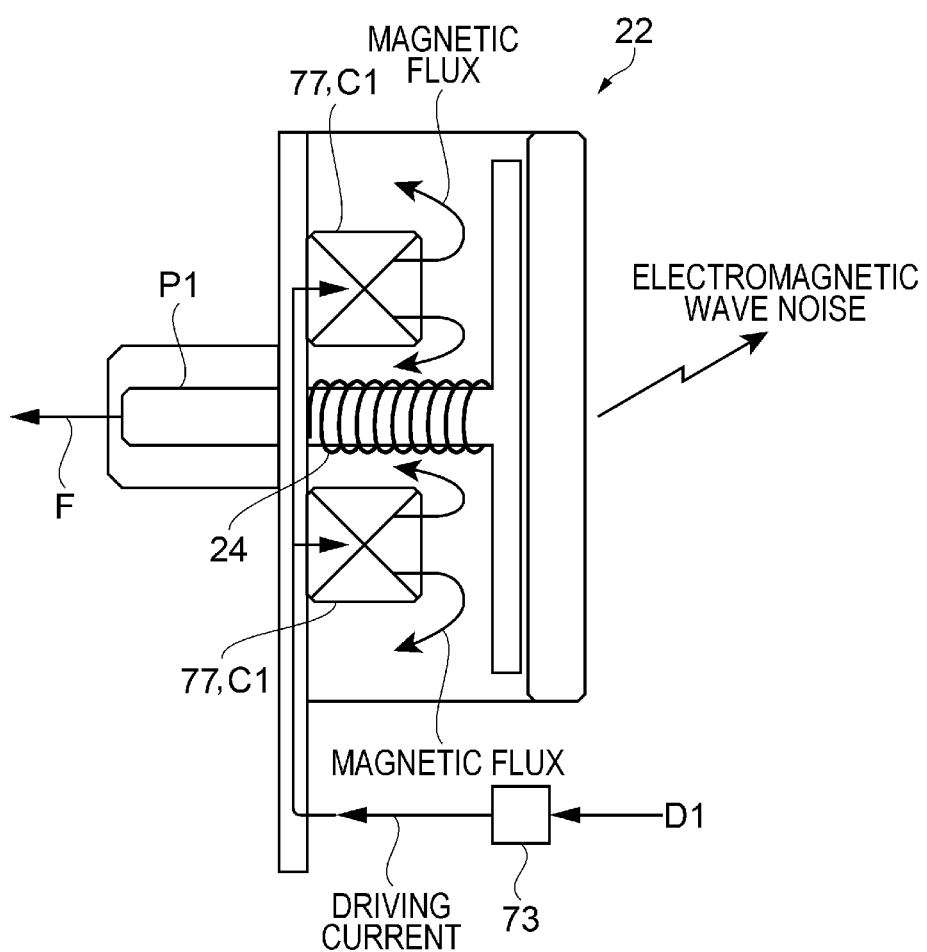
FIG. 4 is a diagram showing an example of a configuration of the printing head.

FIG. 3 is a diagram showing an example of a driving circuit 73 of the printing head 22. FIG. 4 is a diagram showing an example of a configuration of the printing head 22, and a sectional view of a part of a dot pin P1. Other dot pins P2 to P24 also have the same structure.

As shown in FIG. 3, the driving circuit 73 includes a resistor 75, a transistor 76, and a power source 79. In addition, as shown in FIG. 4, in the printing head 22, the dot pin P1 penetrates through a center hole of a coil 77 (C1) wound in a ring shape. The dot pin P1 is biased in a direction (direction opposite to arrow F) in which the dot pin P1 is accommodated in the printing head 22 by the spring 24.

The driving circuit 73 receives driving signals D1 to D24 from a head driving timing control unit 71 (see FIG. 5) which will be described below, and causes the driving current to flow through the coil 77 (C1 to C24) that cause corresponding dot pins P1 to P24 to protrude. For example, in a case where the dot pin P1 protrudes, a driving signal D1 becomes a Hi level, a base current flows into a transistor 76 (Tr1) through a resistor 75 (R1). With this, since the transistor 76 (Tr1) is turned ON, the driving current flows from the power source 79 to the coil 77 (C1). When the driving current flows into the coil 77 (C1), the coil 77 (C1) is excited to generate the magnetic flux and pulled by its magnetic force, and the dot pin P1 protrudes in a direction of an arrow F overcoming biasing force of the spring 24 (see FIG. 4). Similarly, in a case where the plurality of dot pins P1 to P24 protrude simultaneously, all transistors 76 (Tr1 to Tr24) are turned ON and all coils 77 (C1 to C24) are excited simultaneously. The coil 77 is a part of a print driving unit for printing a print dot on the cut sheet 40 which is a print medium, and there is a plurality of print driving units as many as the number of the coils 77 (that is, as many as the number of dot pins). In the following description, "driving the driving circuit 73 to cause a driving current to flow through the coil 77 to cause the dot pin to protrude" may be simply referred to as "driving the dot pin" in some cases.

As described above, when the magnetic flux is generated to the coil 77 at the time of printing and the magnetic flux leaks from the printing apparatus 1 to the outside, the magnetic flux becomes an electromagnetic wave noise. In addition, there is a possibility that the electromagnetic wave noise may be generated by a current flowing through a circuit such as the driving circuit 73 at the time of printing, in addition to the magnetic flux to be generated from the coil 77. Then, as the number of the dot pins P1 to P24 to protrude simultaneously increases, since the magnetic flux generated from each of the coils 77 is overlapped or the driving current flowing in a circuit or the like increases, the magnitude (generated electromagnetic wave noise value) of the electromagnetic wave noise to be generated increases. That is, the resistor 75 and the transistor 76 included in the driving circuit 73 can also be regarded as a part of a print driving unit.

System Configuration of Printing Apparatus

Figure 5:
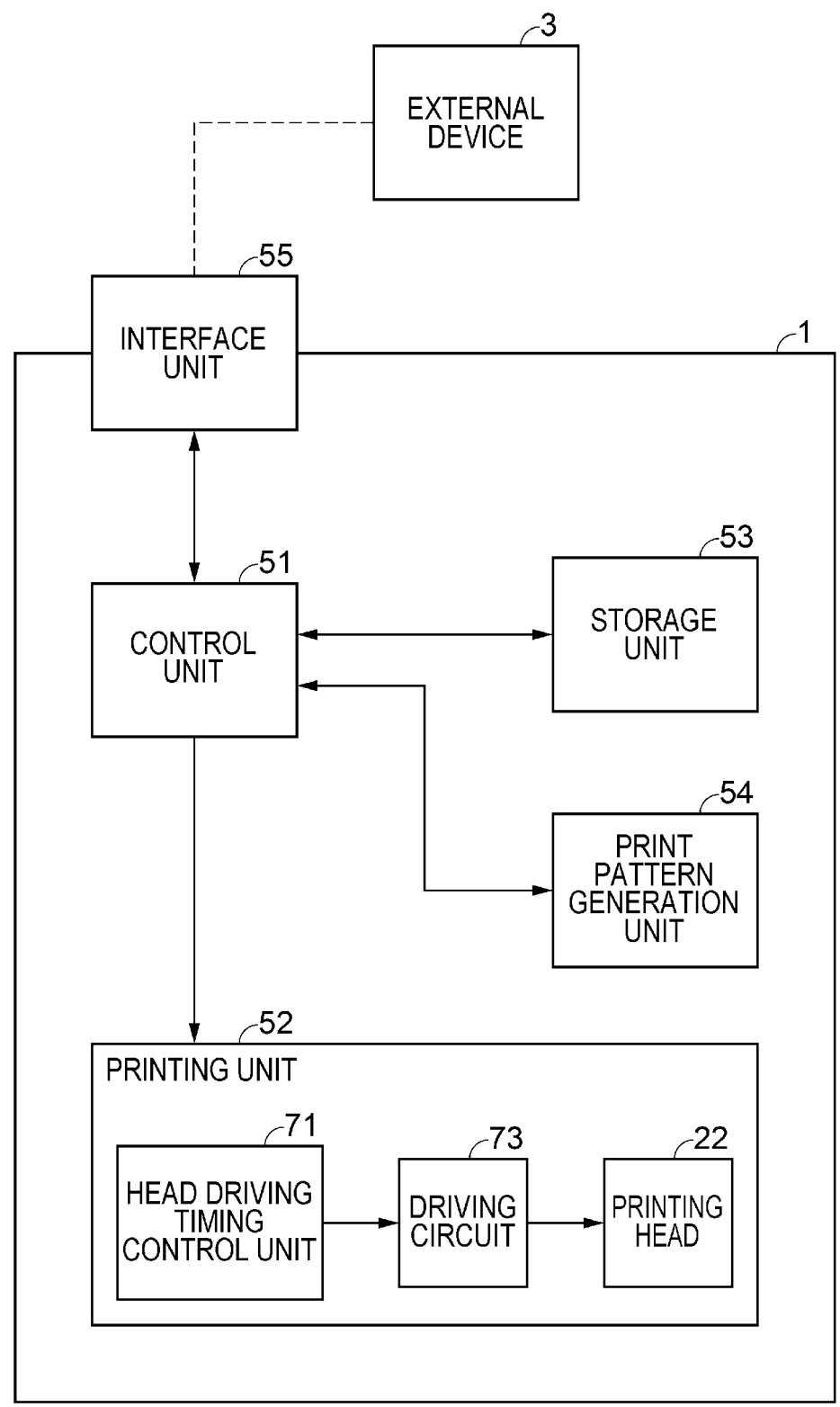
FIG. 5 is a block diagram showing a system configuration of the printing apparatus.

Next, a system configuration of the printing apparatus 1 will be described. FIG. 5 is a block diagram showing a system configuration of the printing apparatus 1. As shown in FIG. 5, the printing apparatus 1 includes at least a control unit 51, a printing unit 52, and a storage unit 53. In addition, the printing apparatus 1 may further include print pattern generation unit 54 and an interface unit 55.

The control unit 51 is configured with a central processing unit (CPU), a read-only memory (ROM), a random access memory (RAM), an application specific integrated circuit (ASIC), or the like, each unit of the printing apparatus 1 is controlled by operating the CPU based on a program stored in the ROM. As will be described in detail later, for example, in a case where the print data is printed, the control unit 51 determines printing conditions (for example, print range, print density, or the like) on the cut sheet 40 according to the print content. Then, the control unit 51 controls the printing unit 52 to perform printing based on a print condition determined based on an operation of a user on an operation unit (not shown) or an instruction sent from an external device 3 connected through the interface unit 55. In addition, the control unit 51 generates the print pattern from the print data, and controls printing in the printing unit 52 by specifying whether any of the dot pins P1 to P24 is used at a timing at the time of printing.

The printing unit 52 includes the printing head 22, the driving circuit 73 (see FIG. 3) for driving the printing head 22, and the head driving timing control unit 71 for controlling a driving timing of the printing head 22. Furthermore, the printing unit 52 includes a printing mechanism (not shown) for performing transport of the cut sheet 40 and the like by scanning the printing head 22. The printing unit 52 prints the print data such as characters and images on the cut sheet 40 according to the control of the control unit 51, and discharges the printed cut sheet 40 to the outside.

The head driving timing control unit 71 controls the driving timing for protruding the dot pins P1 to P24 based on an instruction from the control unit 51. As will be described in detail later, for example, a timing for operating the driving circuit 73 is controlled such that the dot pins P1 to P24 are divided and protrude at a predetermined time interval instructed from the control unit 51. Since a "time interval" is an interval of a time at which driving of the driving circuit 73 starts, the time interval is referred to as a "driving interval" hereinafter.

The storage unit 53 is configured with the ROM and a non-volatile memory, and stores predetermined print data such as the electromagnetic wave noise data, a print template, and a predetermined sentence. As the electromagnetic wave noise data, data of the generated electromagnetic wave noise value to be generated when the printing head 22 is driven, and data of the allowable electromagnetic wave noise value indicating tolerance of the generated electromagnetic wave noise value conforming to various regulations are stored.

A value of the generated electromagnetic wave noise value depends on a structure and used material of the electronic device. Therefore, the generated electromagnetic wave noise value stored in the storage unit 53 is specific data to the printing apparatus 1. Furthermore, in short, even in the same printing apparatus 1, the generated electromagnetic wave noise value differs for each device. In addition, when structure change or the like is generated, the generated electromagnetic wave noise value is changed. Therefore, it is preferable that the storage unit 53 can easily change the electromagnetic wave noise data. In the printing apparatus 1, an IC socket is provided in the storage unit 53 such that a user can easily replace the ROM storing the electromagnetic wave noise data. Alternatively, in the printing apparatus 1, the storage unit 53 is configured with the non-volatile memory in which data can be rewritten, new electromagnetic wave noise data is captured by the control unit 51 from the external device 3 through the interface unit 55, and the electromagnetic wave noise data stored in the non-volatile memory can be rewritten to new electromagnetic wave noise data.

For example, the print pattern generation unit 54 is configured with the ASIC, and generates the print pattern from the print data. The print pattern generation unit 54 generates the print pattern for determining a timing for protruding the dot pins P1 to P24 based on the print data transmitted from the control unit 51, and returns an appropriate print pattern to the control unit 51.

In this manner, since the printing apparatus 1 includes the print pattern generation unit 54 and the print pattern generation unit 54 generates the print pattern instead of the control unit 51, it is possible to reduce a load of processing of the control unit 51 and it is possible to increase the speed of a printing process.

The interface unit 55 is configured with a local area network (LAN) interface, a universal serial bus (USB) interface, or the like, and the printing apparatus 1 performs communication with the external device 3 such as a host device through the interface unit 55.

Operation of Printing Apparatus

Figure 6:
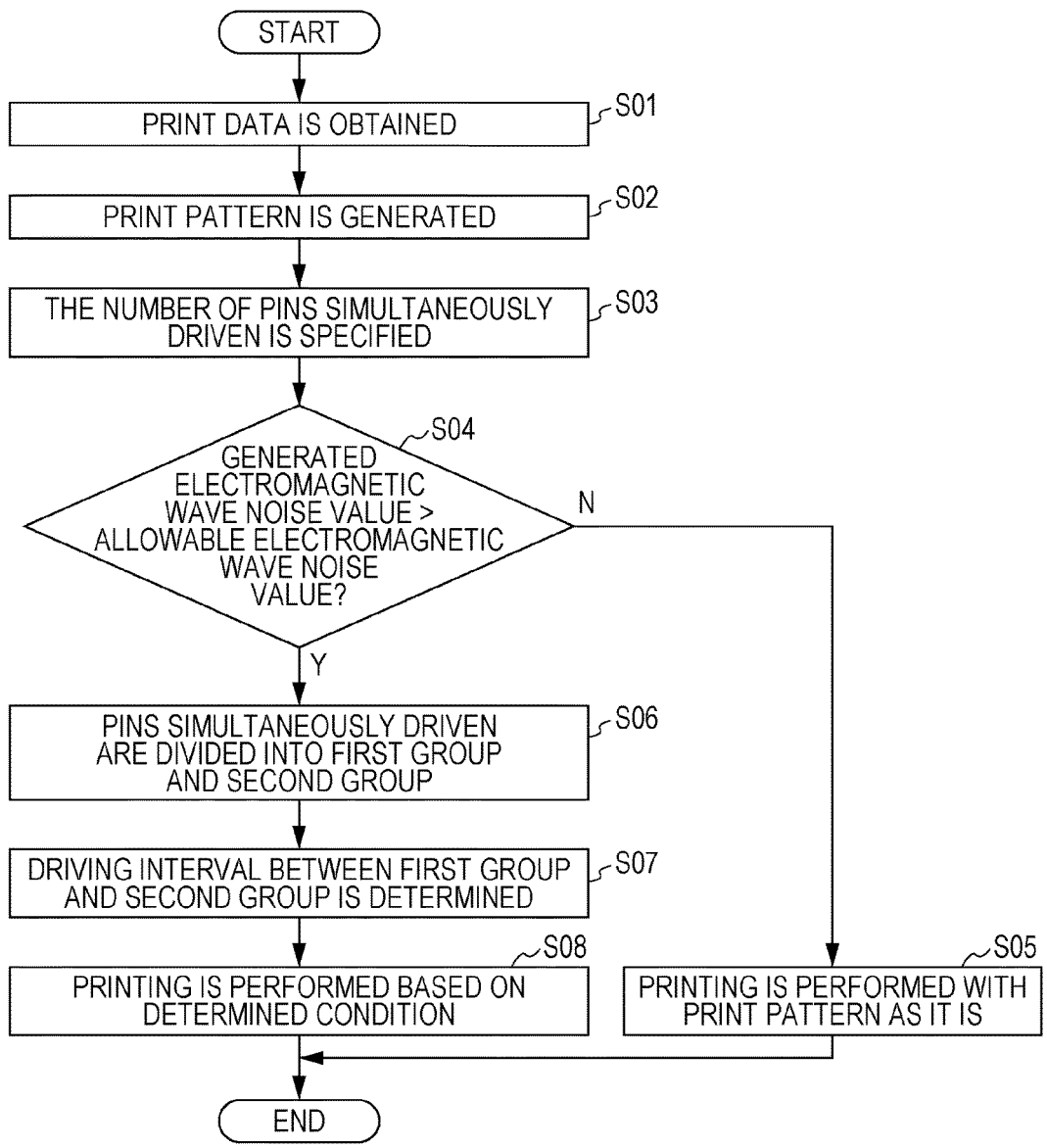
FIG. 6 is a flowchart showing an operation of the printing apparatus.

Next, an operation and a control method of the printing apparatus 1 will be described along a flowchart of FIG. 6 with reference to FIG. 7 and FIG. 8. Therefore, FIG. 7 and FIG. 8 will be described first.

FIG. 7 is a diagram showing an example of the electromagnetic wave noise data stored in the storage unit 53. In FIG. 7, a table 80 shows data of a peak value of the generated electromagnetic wave noise value and data of the allowable electromagnetic wave noise value to be generated in a case where all dot pins P1 to P24 previously measured protrude.

Specifically, for example, in a row in which the driving interval in the table 80 is 0 μS (microseconds), and the generated electromagnetic wave noise value (47.6 dBμV/m) of a case where all dot pins P1 to P24 are simultaneously driven and protrude are described. In addition, in a row where the driving interval is 1 μS or less, the dot pins P1 to P24 are equally divided into two groups of the first group and the second group, the generated electromagnetic wave noise value of a case where the dot pins protrude by driving the two groups at a predetermined driving interval, is described. For example, in a row where the driving interval is 3 μS, the generated electromagnetic wave noise value (41.5 dBμV/m) of a case where the dot pins of the first group and the dot pins of the second group protrude by being driven with a time of 3 μS is described. That is, in a case where the driving interval is 0 μS and all dot pins P1 to P24 are driven simultaneously, a generated electromagnetic wave noise is overlapped to increase the generated electromagnetic wave noise value. However, in a case where it is distributed and driven with the driving interval, since the overlapped generated electromagnetic wave noise decreases, the generated electromagnetic wave noise value decreases.

Therefore, the generated electromagnetic wave noise value is the maximum when the driving interval is 0 μS, and as the driving interval is lengthened and a drive overlap time decreases, the generated electromagnetic wave noise value decreases. Therefore, when the driving interval exceeds a drive time, since there is no overlapping of the drive time, in a case where it is driven by equally dividing into two groups, the generated electromagnetic wave noise value is approximately half or less of the maximum.

In addition, the table 80 includes the allowable electromagnetic wave noise value, for example, in the EMI regulation, the allowable electromagnetic wave noise value (for example, 42.0 dBμV/m) of class A and the allowable electromagnetic wave noise value (for example, 38.0 dBμV/m) of class B are described. Furthermore, if the generated electromagnetic wave noise value is within an allowable range of the allowable electromagnetic wave noise value, the determination code of "○" is described and if it is outside the allowable range, the determination code of "×" is described in each of the driving intervals.

Therefore, from the table 80, in a case where there is a print pattern with a row in which all dot pins P1 to P24 protrude simultaneously is present, in order to comply with the regulation of class A, it is understood that the dot pins of the first group and the dot pins of the second group may be driven by implementing the driving interval of equal to or greater than 3 μS when printing the row. In addition, similarly, in order to comply with the regulation of Class B, it is understood that the dot pins of the first group and the dot pins of the second group may be driven by implementing the drive interval of equal to or greater than 7 µS when printing the row.

In the embodiment, in order to avoid the complication of description, the table 80 in which data of the generated electromagnetic wave noise value in a case where all dot pins P1 to P24 are driven by equally dividing into two groups is described is shown. However, the storage unit 53 may store individually a table in which the generated electromagnetic wave noise value in a case where the plurality of dot pins P1 to P24 equal to or greater than one are combined and driven simultaneously is described (for example, FIG. 9 which will be described below). Furthermore, since the generated electromagnetic wave noise value and the allowable electromagnetic wave noise value are different according to a frequency bandwidth, the storage unit 53 may store individual table for each frequency bandwidth.

In addition, it is preferable that the table 80 of the electromagnetic wave noise data stored in the storage unit 53 be actually printed by using the printing apparatus 1 and the generated electromagnetic wave noise value is measured and created at the time. In this case, the table 80 may be created by measuring the generated electromagnetic wave noise value is measured and the measured result for each unit of the printing apparatus 1, the table 80 may be created by calculating the generated electromagnetic wave noise value which can be applied to the entire of the printing apparatus 1 based on a measured result by a plurality of apparatuses.

Figure 8:
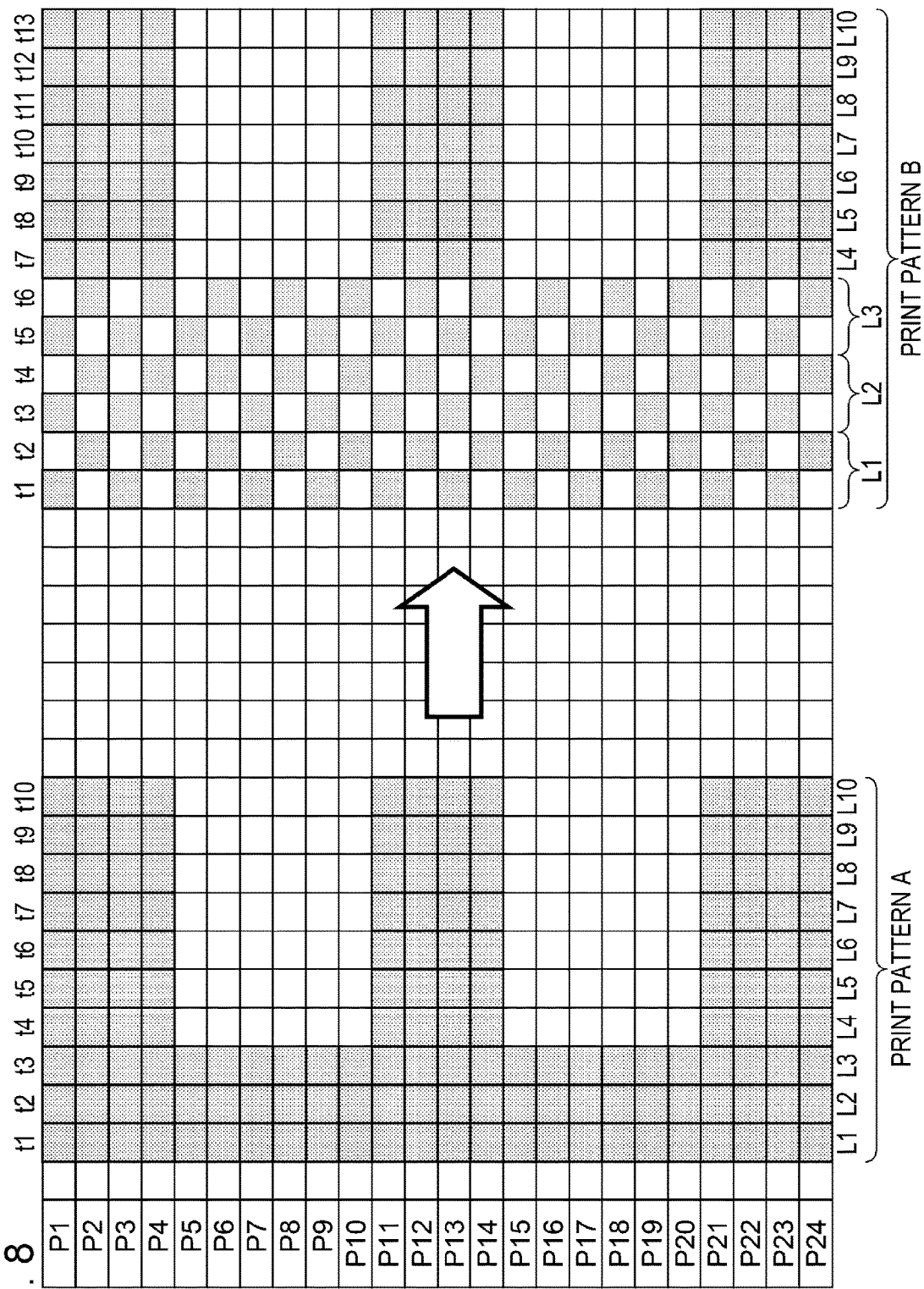
FIG. 8 is a diagram showing an example of a print pattern.

FIG. 8 is a diagram showing an example of the print pattern, and shows the print pattern in a case where a character "E" is printed by the printing apparatus 1. In FIG. 8, a vertical axis shows the print dot corresponding to the dot pins P1 to P24, a horizontal axis shows times t1 to t13, and columns L1 to L10 in a printed result. That is, the carriage 20 in which the printing head 22 is mounted is moved by one column in the scanning direction (right direction in FIG. 8) for each time (t1 to t13).

In FIG. 8, two print patterns of a print pattern A and a print pattern B are shown. In print pattern A, in times t1 to t3 (corresponding to columns L1 to L3), all dot pins P1 to P24 are driven simultaneously and the printing is performed. That is, during the time t1, all dot pins P1 to P24 are driven simultaneously such that the column L1 is printed, and then, the carriage 20 is moved by one row in the scanning direction. During the time t2, all dot pins P1 to P24 are driven simultaneously such that the column L2 is printed. Similarly, during the time t3, the column L3 is printed.

Meanwhile, in the print pattern B, the dot pins P1 to P24 are divided into two groups, the column L1 is divided and printed at the timing of the time t1 and the time t2. Specifically, odd-numbered dot pins P1, P3, . . . are driven during the time t1, and even-numbered dot pin P2, P4, . . . are driven during the time t2. Furthermore, from the time t1 to the time t2, the carriage 20 is moved at a speed within a range where deviation of print dots is allowable in the scanning direction. Therefore, during the time t1 and the time t2, printing is performed in the same row position and the column L1 is printed. Similarly, the column L2 is printed during the time t3 and the time t4, and column row L3 is printed during the time t5 and the time t6.

As a result, in the print pattern A and the print pattern B, a result (result of printing of character "E") printed on the cut sheet 40 is the same, and the number of dot pins driven simultaneously in the print pattern B is reduced as compared to the print pattern A such that the generated electromagnetic wave noise value decreases. Meanwhile, a print time of the print pattern B is longer than that of the print pattern A by the time t4 to t6.

Subsequently, an operation and a control method of the printing apparatus 1 will be described. FIG. 6 is a flowchart showing an operation of the printing apparatus 1.

Step S01: The control unit 51 obtains the print data to be printed among the print data stored in the storage unit 53 or from the external device 3 through the interface unit 55 and the process proceeds to step S02.

Step S02: The control unit 51 generates the print pattern corresponding to the dot pins P1 to P24 (print dot) of the printing head 22 from the print data obtained in step S01. At this time, the control unit 51 may generate the print pattern by itself, or in a case where the printing apparatus 1 includes the print pattern generation unit 54, the printing apparatus 1 may send the print data to the print pattern generation unit 54, and may cause the print pattern generation unit 54 to generate the print pattern.

Step S03: Subsequently, the control unit 51 specifies which dot pins are simultaneously driven when printing the print data from the print pattern. For example, in a case where the character "E" is printed, the control unit 51 specifies that all dot pins P1 to P24 are simultaneously driven during times t1 to t3, and the dot pins P1 to P4, the dot pins P11 to P14, and the dot pins P21 to P24 are simultaneously driven during time t4 to t10, from the print pattern A (see FIG. 8), and the process proceeds to step S04.

Step S04: The control unit 51 checks whether or not the generated electromagnetic wave noise value to be generated when printing the print data exceeds the allowable electromagnetic wave noise value by referring the electromagnetic wave noise data stored in the storage unit 53.

As a result, in a case where the generated electromagnetic wave noise value does not exceed the allowable electromagnetic wave noise value ("N" of step S04), the process proceeds to step S05.

Meanwhile, in a case where the generated electromagnetic wave noise value exceeds the allowable electromagnetic wave noise value ("Y" of step S04), the process proceeds to step S06. Specifically, as shown in the table 80 of the electromagnetic wave noise data (see FIG. 7), since the generated electromagnetic wave noise value when all dot pins P1 to P24 are simultaneously driven is 47.6 dBµV/m (row with 0 µS of driving interval) exceeds the allowable electromagnetic wave noise value (42.0 dBµV/m) of class A and the allowable electromagnetic wave noise value (38.0 dBµV/m) of class B, the process proceeds to step S06.

Step S05: Even if printing is performed based on the print pattern A, since the generated electromagnetic wave noise value does not exceed the allowable electromagnetic wave noise value at the time of printing, the control unit 51 performs the printing as it is without processing any print pattern A, and then the process is completed.

Step S06: When the printing is performed based on the print pattern A, since the generated electromagnetic wave noise value exceeds the allowable electromagnetic wave noise value at the time of printing, the control unit 51 processes the print pattern A. Specifically, the control unit 51 converts the print pattern A into the print pattern B. Therefore, the dot pins P1 to P24 are divided into the first group (first G) configured with odd-numbered dot pins P1, P3, . . . and the second group (second G) configured with even-numbered dot pin P2, P4, . . . the process proceeds to step S07.

Step S07: Next, the control unit 51 determines the driving interval between the driving of the dot pin of the first group and the driving of the dot pin of the second group based on the table 80 of the electromagnetic wave noise data.

For example, according to the table 80, the generated electromagnetic wave noise value when all dot pins P1 to P24 are simultaneously driven is 47.6 dBμV/m (row with 0 μS of driving interval), and equal to or greater than the allowable electromagnetic wave noise value of class A, and the determination code "×". Furthermore, according to the table 80, if the driving interval between the first group and the second group is 3 μS, the generated electromagnetic wave noise value is 41.5 dBμV/m (row with 3 μS of driving interval), the generated electromagnetic wave noise value is equal to or less than the allowable electromagnetic wave noise value of class A, and the determination code is "○". Therefore, the control unit 51 selects and determines the driving interval between the first group and the second group from candidates of the driving interval in which the determination code of a row of class A tolerance of the table 80 is "○".

Furthermore, in order to adapt to class B, the control unit 51 selects and determines the driving interval between the first group and the second group from candidates of the driving interval in which the determination code of a row of class B tolerance is "○". For example, if the driving interval is determined at 7 μS, the generated electromagnetic wave noise value is 37.3 dBμV/m (row with 7 μS of driving interval) such that it is possible to decrease the generated electromagnetic wave noise value less than the allowable electromagnetic wave noise value of class B. However, as the driving interval is widened, the print time increases.

As described above, the control unit 51 creates a program to determine the driving interval in consideration of the allowable electromagnetic wave noise value obtained by the printing apparatus 1 and the print time.

Step S08: The control unit 51 transmits the print conditions and the print pattern determined in step S06 and step S07 to the printing unit 52 (see FIG. 5) and causes to perform the printing. The head driving timing control unit 71 of the printing unit 52 divides a timing for driving the dot pins P1 to P24 into two pieces of timing (for example, t1 and t2) from the print conditions and the print pattern which are received, generates the driving signals D1 to D24, and outputs the generated signals to the driving circuit 73. The driving circuit 73 performs the printing by driving the dot pins P1 to P24 at a timing described in FIG. 8, and completes the process.

Operational Effect

As described above, according to the embodiment, the control unit 51 of the printing apparatus 1 compares the generated electromagnetic wave noise value at the time of printing and the allowable electromagnetic wave noise value in correspondence with the print data. As a result, in a case where the generated electromagnetic wave noise value becomes larger than the allowable electromagnetic wave noise value, the plurality of dot pins (print dot) are divided and driven with a time interval (driving interval), and the number of dot pins simultaneously driven is reduced and then printing is performed on the printing unit 52. With this, as the generated electromagnetic wave noise is suppressed, it is possible to make to be equal to or less than the allowable electromagnetic wave noise value.

In addition, the printing apparatus 1 stores the generated electromagnetic wave noise value and the allowable electromagnetic wave noise value as the electromagnetic wave noise data in the storage unit 53. Since the storage unit 53 is configured with an exchangeable ROM and a rewritable non-volatile memory, even in a case where the configuration of the printing apparatus 1 and the tolerance of the EMI regulation are changed, it is possible to change the electromagnetic wave noise data stored based on this condition. Therefore, it is easy to comply with the EMI regulation.

In addition, by providing the print pattern generation unit 54 in the printing apparatus 1, since it is possible to perform a process for generating the print pattern from the print data in the print pattern generation unit 54, it is possible to decrease a processing load of the control unit 51 and it is possible to increase a print processing speed.

Furthermore, by providing the interface unit 55 for performing communication with the external device 3 in the printing apparatus 1, it is possible to store a result obtained by capturing new electromagnetic wave noise data from the external device 3 in the non-volatile memory of the storage unit 53. As a result, even in a case where the configuration of the printing apparatus 1 and the tolerance of the EMI regulation are changed, by appropriately changing the electromagnetic wave noise data stored based on this condition, it is easy to comply with the EMI regulation.

Next, another example of data of the generated electromagnetic wave noise will be described. FIG. 9 shows a table 90 in which the generated electromagnetic wave noise values in a case where the plurality of dot pins P1 to P24 equal to or greater than one are combined and simultaneously driven are described. In the table 90, data of the generated electromagnetic wave noise value and data of the allowable electromagnetic wave noise value corresponding to the number of simultaneously driven the dot pins (number of simultaneous drive pins) are described.

Specifically, in the table 90, for example, in a case where the number of simultaneous drive pins is 24, the generated electromagnetic wave noise value is 47.6 dBμV/m, in a case where the number of simultaneous drive pins is 17, the generated electromagnetic wave noise value is 41.9 dBμV/m, and in a case where the number of simultaneous drive pins 1, the generated electromagnetic wave noise value is 35.7 dBμV/m.

In addition, as the allowable electromagnetic wave noise value, for example, the allowable electromagnetic wave noise value of class A (for example, 42.0 dBμV/m) and the allowable electromagnetic wave noise value of class B (for example, 38.0 dBμV/m) in the EMI regulation are described. Furthermore, if the generated electromagnetic wave noise value in each of the number of simultaneous drive pins is within the allowable range of the allowable electromagnetic wave noise value, the determination code of "○" is described and if it is outside the allowable range, the determination code of "×" is described.

Therefore, in a case where there is the print pattern having rows which simultaneously protrude by combining the plurality of dot pins, in order to comply with the regulation of class A, from the table 90, it is found that it is necessary to set the number of dot pins simultaneously driven when printing the row to 17 or less. In addition, similarly, in order to comply with the regulation of class B, it is found that the number of dot pins simultaneously driven when printing the row may be set eight or less.

As described above, in order to comply with the EMI regulation, the number of dot pins which can be simultaneously driven is grasped from the table 90. Therefore, the printing apparatus 1 can check whether or not the generated electromagnetic wave noise value in the number of simultaneous drive pins is within the allowable range of the allowable electromagnetic wave noise value based on the table 90 when specifying the number of simultaneous drive pins by generating the print pattern. In a case where the allowable electromagnetic wave noise value is outside the allowable range, by performing division driving to reduce the number of simultaneous drive pins, it is possible to comply with the EMI regulation.

MODIFICATION EXAMPLE

So far, although embodiments of the present invention have been described, various modifications are possible within the scope not departing from the gist of the present invention, for example, as described below.

Modification Example 1

In the above-described embodiment, the SIDM printing apparatus 1 is described as an example of the printing apparatus. However, the technology of the invention can be applied to an ink jet printing apparatus that performs the printing by selectively ejecting an ink from a nozzle of the printing head, or a thermal printing apparatus that performs the printing by using a heat sensitive paper that selectively a heat generating element of the printing head. In a case of the ink jet printing apparatus, one print dot is configured with one nozzle of an ink jet head, and in a case of the thermal printing apparatus, one print dot is configured with one heating element of the thermal head. In the ink jet printing apparatus or the thermal printing apparatus, similar to the above-described embodiment, the electromagnetic wave noise data is created by measuring the generated electromagnetic wave noise value generated when printing the print dot and the created result may be stored in the storage unit 53.

Modification Example 2

In addition, as described above, the electromagnetic wave noise data may be individually created for each device, for each frequency bandwidth, or for each combination of the print dot, and may be stored in the storage unit 53. In this manner, printing control for suppressing the electromagnetic wave noise to be generated can be further appropriately performed.

Modification Example 3

In addition, as described above, a timing during which the dot pins P1 to P24 are driven is divided into two pieces of timing, but the timing may be divided three pieces of timing or four pieces of timing. In this manner, the printing control for suppressing the electromagnetic wave noise to be generated can be further appropriately performed.

The invention is not limited to the above-described embodiments and modifications, and can be realized in various configurations without departing from the spirit of the present invention. For example, in order to solve some or all of the above-described problems or to attain some or all of the above-described effects, the technical features of the embodiments and modifications may be appropriately replaced or combined. Also, unless its technical features are described as essential in this specification, it can be deleted as appropriate.

This application claims priority under 35 U.S.C. § 119 to Japanese Patent Application No. 2017-050914, filed Mar. 16, 2017. The entire disclosure of Japanese Patent Application No. 2017-050914 is hereby incorporated herein by reference.

What is claimed is:
1. A printing apparatus comprising:
a plurality of print driving units that print a print dot on a print medium;
a storage that stores a generated electromagnetic wave noise value which is a value of an electromagnetic wave noise to be generated by driving a print driving unit and an allowable electromagnetic wave noise value indicating tolerance of the generated electromagnetic wave noise, as electromagnetic wave noise data; and
a processor configured to drive the print driving unit,
wherein the processor is further configured to control a number of print driving units that are simultaneously driven by dividing the plurality of print driving units into two groups and driving the two groups at a predetermined driving interval so that the generated electromagnetic wave noise value is equal to or less than the allowable electromagnetic wave noise value.
2. The printing apparatus according to claim 1,
wherein the processor is further configured to reduce a number of a plurality of print dots which simultaneously printed by dividing the plurality of print dots with a predetermined time interval, and controlling the print driving unit.
3. The printing apparatus according to claim 1, further comprising:
a print pattern generation unit,
wherein the print pattern generation unit specifies the plurality of print dots which simultaneously printed by generating a print pattern of the print dot from print data, and
the processor is further configured to specify the generated electromagnetic wave noise value generated at the time of printing based on the print data from the generated electromagnetic wave noise value stored in the storage based on the plurality of the specified print dots which simultaneously printed.
4. The printing apparatus according to claim 1, further comprising:
an interface unit that performs communication with an external device,
wherein the storage is a non-volatile memory in which data to be stored can be rewritten, and
the processor is further configured to capture the electromagnetic wave noise data from the external device through the interface unit, and stores the captured electromagnetic wave noise data in the storage.
5. A control method of a printing apparatus comprising:
driving, by a processor, a plurality of print driving units for printing a print dot on a print medium;
storing a generated electromagnetic wave noise value which is a value of an electromagnetic wave noise to be generated by driving a print driving unit and an allowable electromagnetic wave noise value indicating tolerance of the generated electromagnetic wave noise; and
controlling, by the processor, a number of the print driving units to be that are simultaneously driven by dividing the plurality of print driving units into two groups and driving the two groups at a predetermined driving interval so that the generated electromagnetic wave noise value is equal to or less than the allowable electromagnetic wave noise value.

* * * * *